June 12, 1923.                                                       1,458,367
H. SMITH.
GUARD TILTING DEVICE FOR GRAIN BINDERS
Filed March 18, 1921
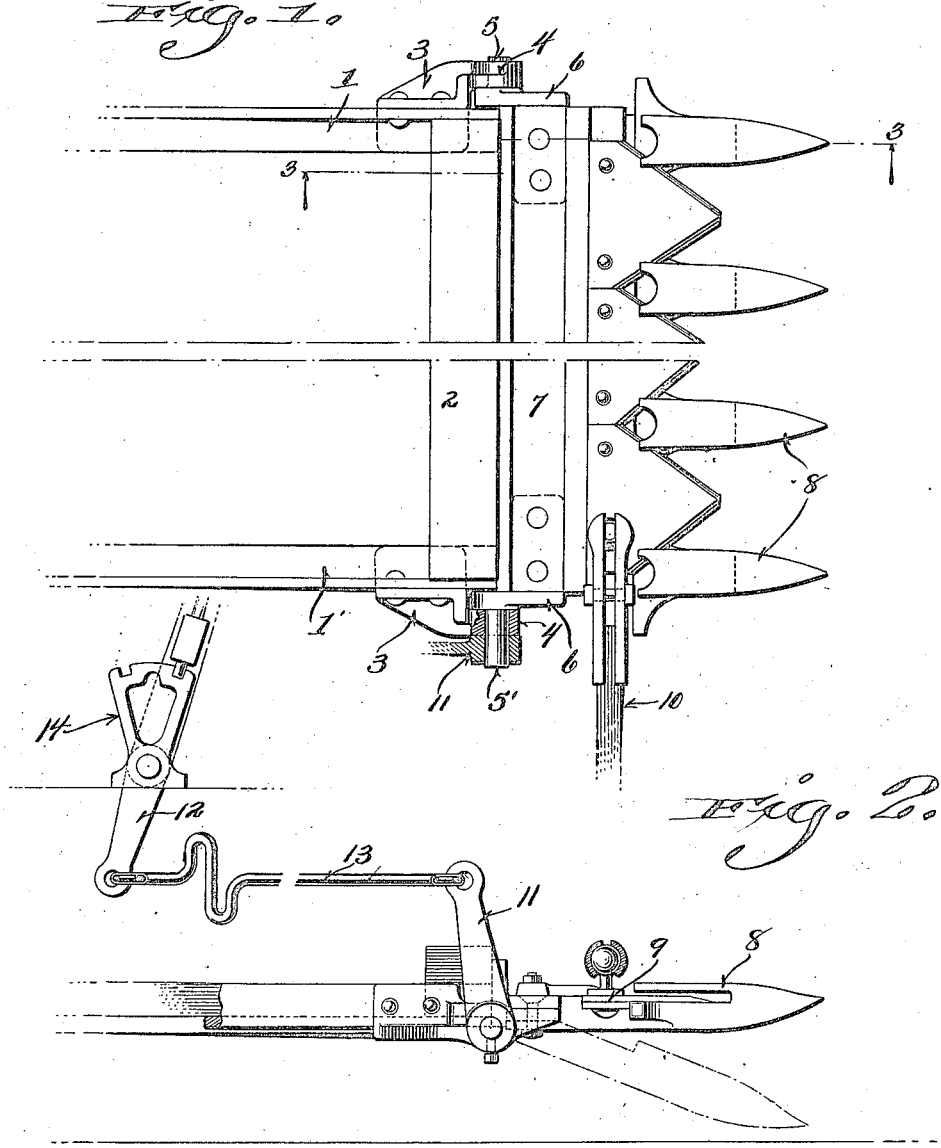
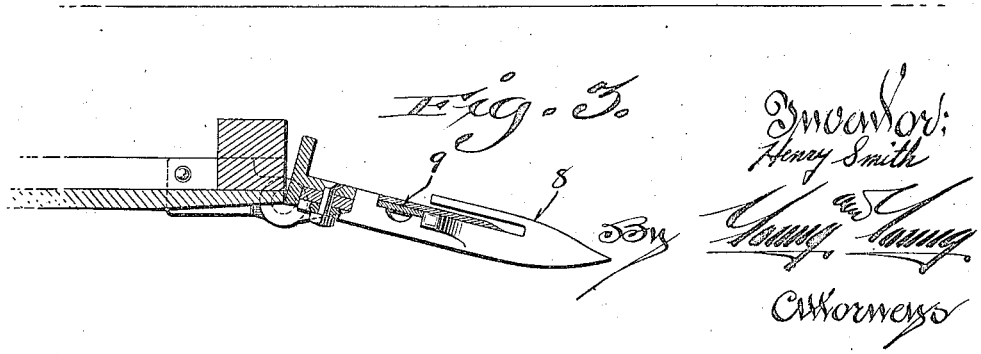

Patented June 12, 1923.

1,458,367

UNITED STATES PATENT OFFICE.

HENRY SMITH, OF LONE ROCK, WISCONSIN.

GUARD-TILTING DEVICE FOR GRAIN BINDERS.

Application filed March 18, 1921. Serial No. 453,324.

*To all whom it may concern:*

Be it known that I, HENRY SMITH, a citizen of the United States, and resident of Lone Rock, in the county of Richland and State of Wisconsin, have invented certain new and useful Improvements in Guard-Tilting Devices for Grain Binders; and I do hereby declare that the following is a full, clear, and exact description thereof.

My invention relates to grain binders, harvesters or the like, and it has for its object to provide a simple, economical and effective means for salvaging down grain, the means primarily being some mechanism for independently tilting the guards as a unit, so as to place them in position close to the ground to lift the fallen or tangled grain, whereby the various attachments for this purpose are avoided, and adjustments bodily of the platform are dispensed with to obtain the desired position of the guards for the purpose mentioned.

The invention, therefore, primarily comprises means for pivotally connecting the finger bar to the platform, together with the fingers or bars. Thus the oscillating cutting mechanism can be bodily oscillated and locked in such oscillating position to cause the ends of the guards to come in juxtaposition to the ground, so as to lift the grain, it being understood that the knife bar will function in connection with its guards in the usual manner, irrespective of the angle to which said guards may be set.

With the above and other objects in view, the invention consists in certain peculiarities of construction, and combination of mechanical elements, as are hereinafter described, illustrated and set forth in the claim.

In the drawings:

Figure 1 represents a fragmentary plan view of binder platform, and its associated cutting mechanism engaging the features of my invention.

Figure 2 is a side elevation of the same, and

Figure 3 is a detail cross section showing the guards in their tilted position, for lifting down grain, the section being indicated by line 3—3 of Figure 1.

Referring by characters to the drawings, 1 and 1' represent the end sills of a platform which are connected at their front ends by a sill 2. In this exemplification of my invention I have shown attached to the end sills 1 and 1' companion brackets 3, which brackets terminate with aligned apertured ears 4 that are adapted to receive trunnions 5 and 5'. The trunnions are extended from brackets 6, which brackets are secured to the ends of an angle iron finger bar 7, and constitute a part of the same. The finger bar is of any standard type, and has secured thereto the usual series of guard fingers 8, which guard fingers carry the standard knife bar 9 that is reciprocated by a pitman 10.

The inner trunnion 5' which is toward the stubble side of the machine, has secured thereto an arm 11 which is connected to a manually controlled lever 12, by means in this instance, of a link rod 13, which is shown crimped at one end to permit a certain amount of flexibility.

The manually controlled lever is mounted upon the frame, at a point convenient to the reach of the operator, by means of a segment bracket 14, and the lever is provided with the usual detent whereby it can be locked in a series of predetermined positions.

When the cutter bar and its associated parts are in their normal position, as shown in Figure 2, the binder will operate in the usual manner and the platform may be raised or lowered for cutting grain at a predetermined height from the ground. In instances where the grain is tangled or down, the operator shifts the position of the hand lever 12, whereby the ends of the guards are tilted downwardly as indicated in dotted lines in Figure 2, and in full lines in Figure 3, in which position they are locked. It will be observed that the ends of the guards may be curved upwardly to a greater or less degree, so that when they assume their angular position for picking up down grain, the points thereof will travel in such position that they are not liable to dig into the uneven surface of the earth.

Owing to the resiliency of the rod 13 obviously the guards are capable of a slight floating movement, so as to compensate for the uneven surface over which they may travel.

Particular attention is called to the fact that the front sill of the binder platform has, under normal conditions, the vertical flange of the angle iron finger bar bolted thereto. The problem, which I have solved, is particularly directed to utilizing all of the standard elements of a grain binder, and hence it will be noted that the angle iron finger bar's position with relation to the front face of the platform sill 2 has not been changed. The pivot connection of the angle iron finger bar is so positioned with relation to the same and the front sill that the angle iron rocks upon the lower corner of said front sill, and hence when the angle iron finger bar is in its normal position, it will abut the front face of the sill, which front face serves as a stop for the finger bar when the manually controlled mechanism is swung to lift said finger bar and its parts to normal position. Thus it will be seen that the angle iron and fingers will function normally under conditions where it is not necessary to drop the ends of the guards, and the pivot connection, in effect, is of the rule joint type so as to yieldingly hold the inner face of the vertical angle of the finger bar against the outer face of the sill 2.

While I have shown and described one way of carrying out my invention in all of its detail, I may vary the structural features within the knowledge of the skilled mechanic and a fair interpretation of the claim, the essential feature being some mechanical arrangement whereby the guard fingers can be tilted upon an axis independent of the platform.

I claim:

A harvester having a platform, a finger bar in pivotal union therewith, guard fingers rigidly secured to the finger bar, means for oscillating said finger bar and associated guard fingers whereby they are raised and lowered independent of the platform, a rod having resilient loops therein pivotally connected with said means and means for locking said rod in a plurality of positions for locking the said finger bar in a plurality of positions.

In testimony that I claim the foregoing I have hereunto set my hand at Lone Rock, in the county of Richland and State of Wisconsin.

HENRY SMITH.